April 8, 1947.  M. FERRARA  2,418,703
BALL BEARING ROLLER BOB SLED TYPE VEHICLE
Filed Nov. 7, 1945
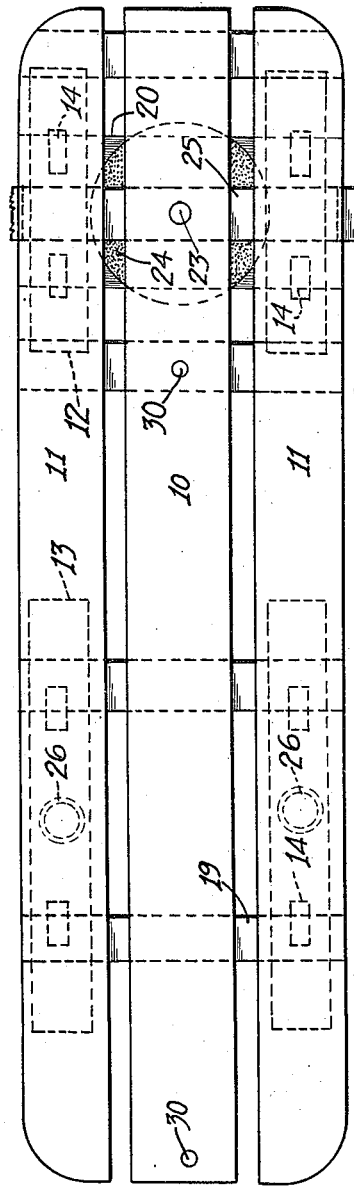
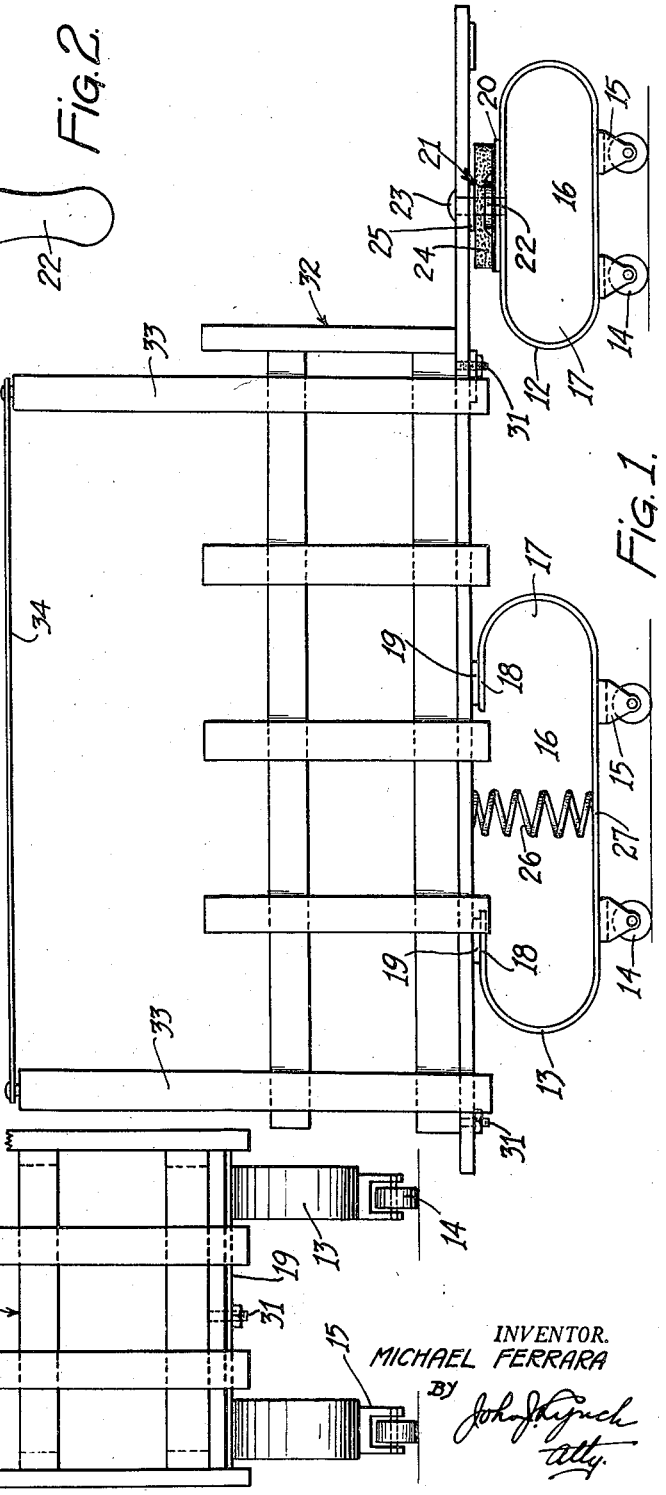
INVENTOR.
MICHAEL FERRARA
BY John J. Lynch
Atty.

Patented Apr. 8, 1947

2,418,703

UNITED STATES PATENT OFFICE 2,418,703

BALL BEARING ROLLER BOBSLED TYPE VEHICLE

Michael Ferrara, Brooklyn, N. Y.

Application November 7, 1945, Serial No. 627,250

3 Claims. (Cl. 280—87.03)

1

This invention relates to toy or play vehicles of the coaster type which may be propelled by pulling, pushing, or by a rowing action of the hands when the rider is lying on the vehicle.

One of the main objects of the invention is to provide a vehicle that may be used in coasting down hill and which when travelling over uneven places in the ground, will rise in the air and then land with a jouncing action to give the rider a thrill. Another object is to provide a vehicle which employs flexible bands upon which rollers are mounted, but which may be used without the wheels or rollers when snow and ice is on the ground to permit travel of the vehicle on the band members; further objects being to use the vehicle over any kind of surface as ice or hard ground with the wheels in place and to provide ball bearing wheels that make for easy travel of the device. Further objects are to provide for braking means by swinging the front bands laterally of the body or at right angles to the rear bands about their pivot point; to give bouncing effect to the vehicle by the use of the relatively tough resilient or flexible band members; to provide a free coasting vehicle on a down grade; to provide a low center of gravity in a device of this type for the safety of the rider and to render the bouncing effect easy and without jarring action that might result in injury to the rider. Also the use of a body permits the holding of a mattress and pillow and the vehicle can serve as a crib or cradle and be given a sidewise swaying motion as well as a to and fro movement.

I have provided a novel form of wheel mounting that permits a swaying and bobbing action of the body due to the use of the steel bands arranged in the form of a wheel mounting together with a helical spring device that prevents the bands from sagging in the lower reaches thereof under a load and maintains the wheel in contact with the ground as the vehicle passes over obstructions or rough places in the ground.

A further object of the invention is to provide a vehicle of the nature referred to which can be used as a wagon, or as a bob sled type wheeled vehicle and one that can be used in a manner similar to the use to which sleds are put; to also employ with the vehicle a removable top body and canopy member; and to make use of a novel form of steering gear that will keep the vehicle on a true course when used in free coasting or without concentrated attention on the part of the rider.

With these and other objects in view, the invention comprises certain constructions hereinafter

2 described and then particularly pointed out in the claims and a preferred embodiment of my invention is illustrated in the accompanying drawing, in which:

Figure 1 is a view in side elevation of a wheeled vehicle or ball bearinged roller bob sled, showing a detachable top in position thereon, Figure 2 is a top plan view of the vehicle illustrated in Figure 1 with the body and canopy top removed therefrom, and Figure 3 is a view in rear elevation of the vehicle shown in Figure 1, parts being broken away for convenience of illustration.

Referring to the drawing in detail, 10 indicates the center and 11 the outer floor boards forming the platform of the vehicle and to the latter of which are secured roller or wheel bands 12 at the front of the vehicle and similar bands 13 at the rear of the vehicle. The front bands 12 as well as the rear bands 13 are made from highly tempered steel substantially wider than the wheels 14 that are attached to the lower reaches thereof by the fixed caster type bearings 15. The front and rear bands are elliptical in shape, presenting an oblong portion 16 with rounded ends 17. The ends of the bands 12 abut to form a closed mounting, but the ends of the bands 13 are separated and attached as at 18 to cleats 19 that join the floor boards 10 and 11 across the rear portion of the vehicle. The front bands 12 are secured in any suitable manner to a metal cross plate 20 that forms a mounting for the steering gear 21. The latter consists of a cross bar 22 fixed to the center steering pin 23 to which is also attached the cross plate 20. Upon the cross bar 22 rests a sponge rubber disk 24 underlying a cross cleat 25 that joins the floor boards in unitary structure at the front of the vehicle. This rubber disk because of its soft or yielding character permits the cross bar 22 to be embedded therein as shown in Figure 1 to permit steering and to yieldably hold the steering bar 22 in whatever position it is moved to and thus provide a means for maintaining the vehicle on a true course even when the steering bar is not manipulated as is necessary in most steerable vehicles. The smooth or finished side of the disk 24 is uppermost so that the frictional resistance to turning is least at the point where the disk contacts the cleat. The wheels 14 are ball bearing mounted.

The rear bands 13 as well as the front bands 12 have the wheels secured thereto in the oblong portions 16 thereof and the rear bands in the lower center portions thereof provide a support for the helical springs 26 which engage said bands at a point 27 midway between the wheels and are suitably secured to the bands and to the under side of the floorboards midway between the open ends of the bands 13. This particular structure has several advantages. When a weight is placed on the vehicle that is not distributed evenly, the tendency is for the bands to skew laterally and for the rollers or wheels to come together and the bands to become distorted so that the vehicle will not roll freely. The spring bands are made of metal that is light and flexible enough to provide a bounce or a bobbing and sidewise motion, but such a spring is too thin to support a load without becoming distorted and allowing the wheels to spread arcuately where the wheels are spread apart as at the rear and where the band oval is long and has its ends not closed as at the front of the vehicle. The coil spring 26 in each band resists the tendency of the band to collapse at its center, but permits the band to yield at its ends to give a jouncing motion to the body of the vehicle without allowing the wheels to spread.

If desired the board 10 may be bored as at 30 to receive bolts 31, through the medium of which a top structure 32 or body having open sides and ends may be attached. The body has corner posts 33 to which a cover 34 or canopy may be attached. The body may be used for carrying packages, small children or any other purpose and can be conveniently removed when the vehicle is to be used in the nature of a sled by children. This latter use is made possible because the landing shocks of the vehicle on the ground are taken up by the springs 26, the forward bands being of smaller formation and being closed as well as more closely looped provide sufficient resistance against collapse under shock or load to which the vehicle is subjected in use.

It is evident that the vehicle having a low center of gravity is hard to tip, will bounce and jog without collapse of the bands, and will because of the relatively wide nature of the bands permit the swaying motion desired, the bands resisting said swaying motion by their torque limits short of permitting the overturn of the vehicle. While I have referred to ball bearing roller bob sled as an indication of the type of vehicle I have invented, it is further evident that snow or ice runners can be substituted for the wheels and the same characteristics be maintained as in the use of the device as a wheeled vehicle.

My invention is not to be restricted to the precise details of construction shown since various changes and modifications may be made therein without departing from the scope of the invention or sacrificing the advantages derived from its use.

What I claim is:

1. In a vehicle of the character described, the combination with the body structure thereof, of wheel mountings comprising a plurality of front and a plurality of rear relatively wide flexible band members each arranged in elliptical shape and presenting an oblong portion and rounded end portions, means for attaching the bands to and longitudinally of said body structure adjacent opposite ends of the latter, wheels spaced along the bottom of each band for ground engaging contact and a helical spring between the lower reach of each of the rear bands and the body structure for preventing abnormal distortion of said rear band members.

2. In a vehicle of the character described, the combination with a body structure thereof, of wheel mountings comprising a plurality of front and a plurality of rear flexible band members each arranged in an elliptical shape to present an oblong portion and rounded end portions, means for attaching the band to and longitudinally of the body adjacent opposite ends of the latter, wheels on said band members for ground engaging contact, a bar extending across the top of said front band members for pivotally turning the same in steering operation, and a resilient cushion disk intermediate the said bar and the body structure for yieldably resisting steering movement of said bar.

3. In a vehicle of the character described, the combination with the body structure thereof, of wheel mountings comprising a plurality of front and a plurality of rear relatively wide flexible band members each arranged in elliptical shape to present oblong portions and rounded end portions, means for attaching the bands to and longitudinally of the body structure adjacent opposite ends of the latter, wheels spaced along the bottom of each band for ground engagement, a helical spring between the lower reach of each of the rear bands and the body structure for preventing abnormal distortion of said rear band members, a bar extending across the top of the said front band members for pivotally turning the same in steering operation, and a resilient cushion disk intermediate the said bar and the body structure for yieldably resisting steering movement of said bar.

MICHAEL FERRARA.

REFERENCES CITED

The following references are of record in the file of this patent:

UNITED STATES PATENTS

| Number | Name | Date |
|---|---|---|
| 1,520,381 | White | Dec. 23, 1924 |
| 162,165 | Godley | Apr. 20, 1875 |
| 829,900 | Shelmire | Aug. 28, 1906 |
| 1,732,374 | Neal | Oct. 22, 1929 |

FOREIGN PATENTS

| Number | Country | Date |
|---|---|---|
| 52,424 | Swiss | July 15, 1910 |